US008063815B2

(12) United States Patent  (10) Patent No.: US 8,063,815 B2
Valo et al.  (45) Date of Patent: Nov. 22, 2011

(54) METHOD AND SYSTEM FOR AUTOMATIC CLASSIFICATION OF OBJECTS

(75) Inventors: Hilde Valo, Asker (NO); Jens Fredrik Hjelmstad, Lillestrøm (NO); Atle Onar Knapskog, Skedsmokorset (NO)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 434 days.

(21) Appl. No.: 12/300,972

(22) PCT Filed: May 16, 2006

(86) PCT No.: PCT/NO2006/000182
§ 371 (c)(1),
(2), (4) Date: Nov. 14, 2008

(87) PCT Pub. No.: WO2007/133085
PCT Pub. Date: Nov. 22, 2007

(65) Prior Publication Data
US 2009/0184865 A1    Jul. 23, 2009

(51) Int. Cl.
*G01S 13/90* (2006.01)
(52) U.S. Cl. .............. 342/25 R; 342/25 A; 342/25 F; 342/90; 342/179
(58) Field of Classification Search ............ 342/25 R, 342/25 A–25 F, 41, 64, 90, 179, 191, 194–197
See application file for complete search history.

(56) References Cited

U.S. PATENT DOCUMENTS

| 4,546,354 | A | * | 10/1985 | Boles | 342/179 |
|---|---|---|---|---|---|
| 4,829,306 | A | * | 5/1989 | Gjessing et al. | 342/159 |
| 4,845,610 | A | * | 7/1989 | Parvin | 712/17 |
| 4,887,304 | A | * | 12/1989 | Terzian | 382/209 |
| 4,901,362 | A | * | 2/1990 | Terzian | 382/197 |
| 4,992,797 | A | * | 2/1991 | Gjessing et al. | 342/192 |
| 5,012,252 | A | * | 4/1991 | Faulkner | 342/192 |
| 5,040,231 | A | * | 8/1991 | Terzian | 382/197 |
| 5,309,159 | A | * | 5/1994 | Shahaf et al. | 342/90 |
| 5,497,158 | A | * | 3/1996 | Schmid et al. | 342/90 |
| 5,546,084 | A | * | 8/1996 | Hindman | 342/25 F |
| 5,821,896 | A | * | 10/1998 | Nakano et al. | 342/90 |
| 5,949,367 | A | * | 9/1999 | Trompf et al. | 342/90 |
| 5,963,653 | A | * | 10/1999 | McNary et al. | 382/103 |
| 6,023,235 | A | * | 2/2000 | Sauer | 342/25 F |
| 7,138,999 | B2 | * | 11/2006 | Alliez et al. | 345/423 |
| 7,496,228 | B2 | * | 2/2009 | Landwehr et al. | 382/170 |
| 7,940,206 | B2 | * | 5/2011 | Nohara et al. | 342/59 |
| 2002/0050988 | A1 | * | 5/2002 | Petrov et al. | 345/418 |
| 2002/0057216 | A1 | | 5/2002 | Richardson et al. | |

(Continued)

OTHER PUBLICATIONS

V Gouaillier; L Gagnon: "Ship Silhouette Recognition Using Principal Components Analysis" Applications of Digital Image Processing XX Jul. 30-Aug. 1, 1997 San Diego, CA, USA, vol. 3164.

*Primary Examiner* — John Sotomayor

(57) ABSTRACT

A new method has been developed as an attempt to improve speed and robustness of existing ISAR classification methods. The new method produces a set of silhouettes of possible models in a 3D model database. The set of silhouettes of each model views the model from various viewing angles, as the target dimensions will vary as it is viewed from different angles. The silhouettes are stored as a training set. Classification is done by comparing the silhouette of the target with the set of silhouettes in the training set. The silhouettes are calculated prior to the silhouette matching.

18 Claims, 2 Drawing Sheets

U.S. PATENT DOCUMENTS

| | | |
|---|---|---|
| 2003/0028293 A1* | 2/2003 | Jankowiak et al. ............. 701/21 |
| 2004/0090438 A1* | 5/2004 | Alliez et al. .................. 345/423 |
| 2005/0140670 A1* | 6/2005 | Wu et al. ....................... 345/419 |
| 2009/0184865 A1* | 7/2009 | Valo et al. .................... 342/25 F |

* cited by examiner

METHOD AND SYSTEM FOR AUTOMATIC CLASSIFICATION OF OBJECTS

TECHNICAL FIELD

The present invention relates to the field of image processing in general. It is particularly applicable for automatic classification of objects observed in Inverse Synthetic Aperture Radar (ISAR) images, but may find applications in other fields as well.

BACKGROUND

Inverse Synthetic Aperture Radar (ISAR) is a technique for high-resolution imaging of radar objects. A radar system supplies a sequence of images of moving objects. The radar images may have a striking likeness with the visual image of an object, and an operator may then perform manual classification of the object by visual analysis of the ISAR image. However, in a rapidly developing situation with many objects present on the radar screen, the operator will have very short time available to perform a correct classification. It would be very desirous to have an automatic tool available for classifying ISAR objects. This would reduce the radar operator workload, and lead to a more efficient use of the radar.

From literature there is known several method for automatic ship classification. In Musman, S.; Kerr, D.; Bachmann, C.; Automatic Recognition of ISAR ship images, IEEE Transactions on Aerospace and Electronic Systems, Vol. 32, No. 4, October 1996, pp. 1392-1403, there is presented a method based on comparing the shape of an object with wire-frame models.

A different implementation of this method is described in Knapskog, A. O.; Automatic Classification of Ships in ISAR Images Using Wire-Frame Models, Proceedings 5th European Conference on Synthetic Aperture Radar, 953-956. In this method the ISAR image of an object is compared with wire-frame models of possible objects stored in a database. Before a comparison is made, the orientation of the object in the ISAR image is found by analysing prominent features of the hull, e.g. the ship's centreline and positions of the hull sides, and candidate models in the database are transformed into the same orientation. Silhouettes of the observed object and the models are extracted and compared.

In the existing method each relevant model in the model database must be transformed for each ISAR object image. This makes the method rather slow, which makes it not suitable for real time classification.

Also, the method is vulnerable to inaccurate estimation of certain features. For example a ship centreline can be found by fitting a straight line through the object by the method of least squares. Tall structures (e.g. a mast) on the object will affect the least squares line fit. By manual operation the effect may be reduced. The hull side is found by fitting a second-degree curve to the side of the side of the object by the method of least squares. Often only one (the near-) side is visible on the ISAR image. The invisible side would then have to be found by mirroring the near side of the object. This makes the existing method not suitable for automatic and real-time classification of radar objects.

SUMMARY

The present invention provides a new method and system for classification of observed objects in an image, which is an improvement over prior art methods and systems in being less demanding as to processing power and providing a more reliable classification.

This is achieved in a method as claimed in the appended claim 1 and a system as claimed in claim 16.

In particular, the present invention provides a method for automatic classification of an observed object in an image. Said method includes an initial step of extracting the silhouette for the observed object. Then, a size parameter for the object's silhouette is determined. Training silhouettes for model objects with identical size parameters are retrieved from a database with a range of training silhouettes representing model objects of different classes and with different orientation angles. The next step is to compare the silhouette of the observed object with said retrieved training silhouettes. Lastly the observed object is classified as being of the model object class with highest correlation between the silhouettes of the observed and model objects.

The invention also includes a system for automatic classification of an observed object in an image. Said system includes a sensor supplying at least one image showing an observed object of interest, as well as means for extracting a silhouette of said observed object and determining a size parameter for said silhouette. A database is used for storing training silhouettes of classified model objects in several orientations. Further, the system includes means for selecting a set of training silhouettes of model objects with similar size parameters as in the observed object and which is adapted to retrieve said selected set from the database. The system also includes means for comparing the silhouette of the observed object with said set of selected training silhouettes, said means being adapted to classify said observed object as being of the class corresponding to the training silhouettes which best matches the silhouette of the observed object.

Other advantages of the present invention are that object ID may be presented to the operator in high definition human interpretable form; as an object ID, code or a synthetic high definition optical image. The system will report object ID as pointer or reference to object, thus enabling low data rate transmission. In addition, the training silhouette data are compact and large data libraries may be formed without claiming too much storage space. Seen from another angle; very large training sets with large number of models may be formed. Hence, a larger range of objects will be in the database. This may increase the probability of correct classification.

Other advantageous embodiments of the invention will appear from the following dependent claims, as well as from reading the following detailed description in which the invention is described in reference to the appended drawings.

DETAILED DESCRIPTION

Figure 1:
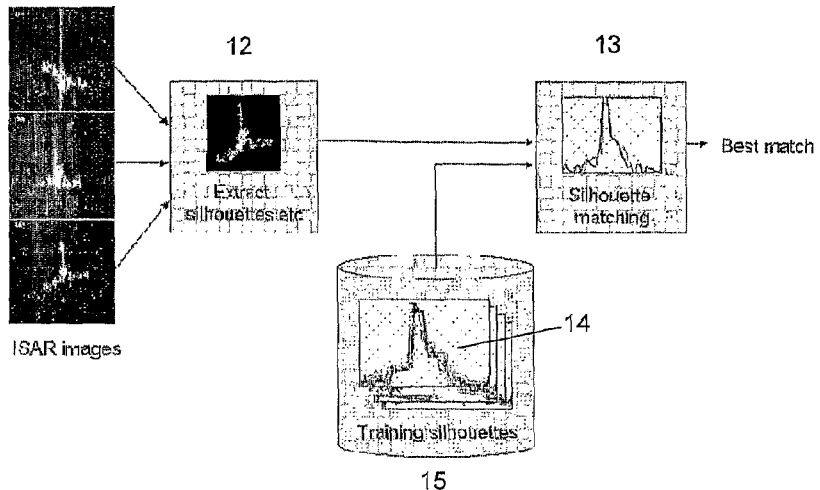
FIG. 1 is a block diagram of the invention.

FIG. 1 illustrates the new classification process according to the invention. A sequence of ISAR image frames 11 of an object, in this case a ship rolling in the sea, is received from a radar observation platform (not shown).

Briefly, the images are processed in a pre-processing unit 12, where the silhouette of the observed object is extracted. This silhouette is supplied to a classification unit 13, where it is compared with training silhouettes 14 taken from a database 15.

The pre-processing unit 12 and classification unit 13 may be realized as dedicated processing units connected in a network, or as software applications in some general processing equipment such as a server. The database may be local to said processing equipment, or a remote unit connected to the processing equipment by a network.

Explained in further detail, ISAR imaging gives two dimensional profiles of three dimensional objects. The actual projection plane depends on the movement pattern and dominant axis of movement of the object. In order for silhouette matching to be useful it is important that the silhouette/height profile of the object is visible in the ISAR images. Often only up to 50% of images proves useful for silhouette matching. First the image is segmented in pre-processing unit 12, which implies separation of the object from the surrounding clutter and noise. Then a set of features which describes the extent and the orientation of the object are extracted, including the centreline, hull sides and height profile. The ship centreline can be found from the Hough [1] transform or by fitting a straight line through the object by the method of least squares [2]. The hull side is found by fitting a second degree curve to the side of the object by the method of least squares. The features are used for image frame selection for the classification. An image is rejected if the object orientation is close to the cross-range direction (as this is an indication of unfavourable imaging geometry), or if the height profile is relatively low. For images that are accepted, the range and silhouette of the object is passed onto the classification unit 13. The silhouette of an object may be formed using edge detection.

Please note that said set of features are used only for selecting images suited for classification, and are not used in following the classification process. This makes the inventive method less vulnerable for errors in the feature estimates.

Observed object classification is done by silhouette matching in classification unit 13. The silhouettes extracted from one or more ISAR images are compared with parts of the training data 14 from the database 15. The relevant training data selection is based on knowledge of the length of the object as seen in the silhouette. When the length is extracted then only the training data with similar length (corrected for range) may be used for silhouette matching. Therefore only certain aspect angles are possible for each model, hence the silhouettes corresponding to those angles are chosen. The Nearest neighbour classifier [3] is used for finding the best match between the target and training silhouettes.

The classified object is preferably presented to the operator in high definition human interpretable form instead of the raw ISAR image. The object may e.g. be presented as object identification text, code or a synthetic high definition optical image. The system is adapted to report object ID as a pointer or reference to the object. The information to be presented to the operator may then be retrieved from a local storage, thus enabling low data rate transmission between the various units of the system. The object ID may be presented together with statistical information as to the importance of the object and the reliability of the classification result. The reliability figures may be taken from prior history of classification results, or in its simplest case by analyzing the distribution of hits in the different classed.

Comparing only the silhouettes of objects requires less computational effort, and a match between the object silhouette and the training set is obtained faster. Furthermore the new method is more robust and leads to faster convergence and more secure object classification.

Figure 2:
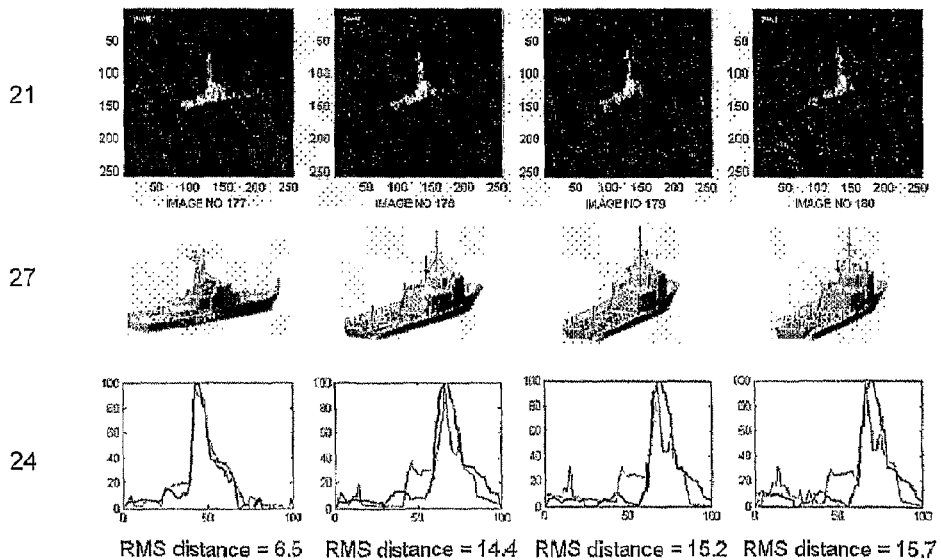
FIG. 2 illustrates classification by testing several ISAR image frames simultaneously.

In order to improve the classification method still further, several frames in an ISAR sequence may be subjected to individual classification in parallel. This is illustrated in FIG. 2 showing a sequence of ISAR images 21 of an object. The diagrams 24 shows the matches obtained between object silhouettes (thin line) and training silhouettes (heavy line) of models 27 giving best fit. The degree of matching between the graphs is given as RMS distance. Note that two different models are shown at 27. In the left hand case there has been obtained a match with the correct class. In the other cases erroneous classification results have been obtaining because of the low visibility of the ship's bow in the ISAR images. Then, the visible part of the ship is more akin to another class of ships. In general, better results are obtained from broadside images. Instead of testing the ISAR images separately, several images are tested in parallel obtaining the class giving the best match altogether. In this case, the best match is obtained with the image at left (PMS distance=6.5, which is a much better match than for the other images). It is typical that better RMS values are obtained from good ISAR images matching a correct class compared with bad images matching an erroneous class. The object of testing several images simultaneously is to obtain a correct classification result even if there are some bad images present that individually would lead to an erroneous result.

Figure 3:
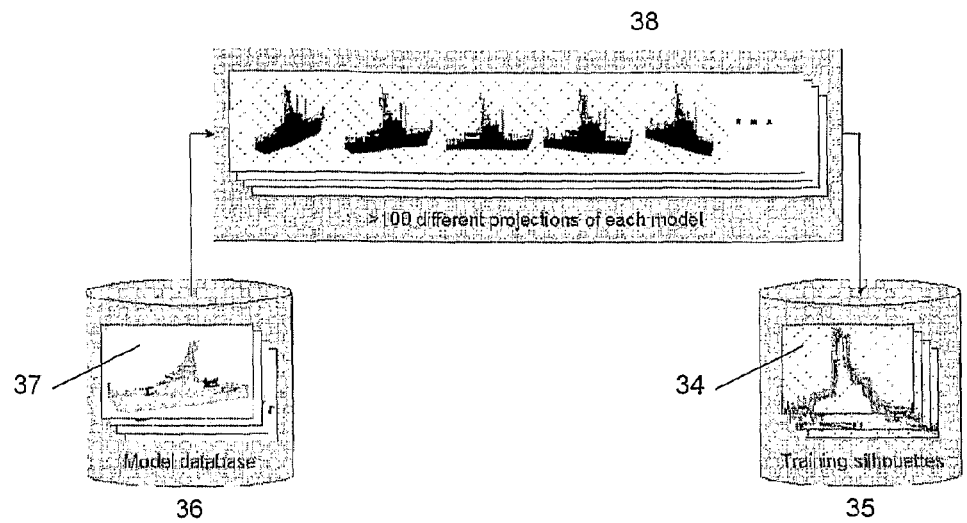
FIG. 3 illustrates the production of training silhouettes.

FIG. 3 illustrates the method used when forming the training silhouettes. A number of 3D wire-frame models 37 representing classes of objects are stored in a model database 36. From each class a number of different model projections 38 are formed, each representing a particular rotation and stretching of the model. From the projections 38 training silhouettes 34 are extracted and stored in the training database 35. Conform numbering is used in the figures, i.e. the database 35 in FIG. 3 corresponds with database 15 in FIG. 1.

The training data could in principle include both silhouettes extracted from real ISAR images, and silhouettes predicted from the 3D wireframe models. A large number of silhouettes could be produced from each model, produced by rotating and stretching the model. This corresponds to ISAR images with a variety of aspect angles, elevation angles, and target rotation rates. The silhouettes are normalized before entered to the training set.

Figure 4:
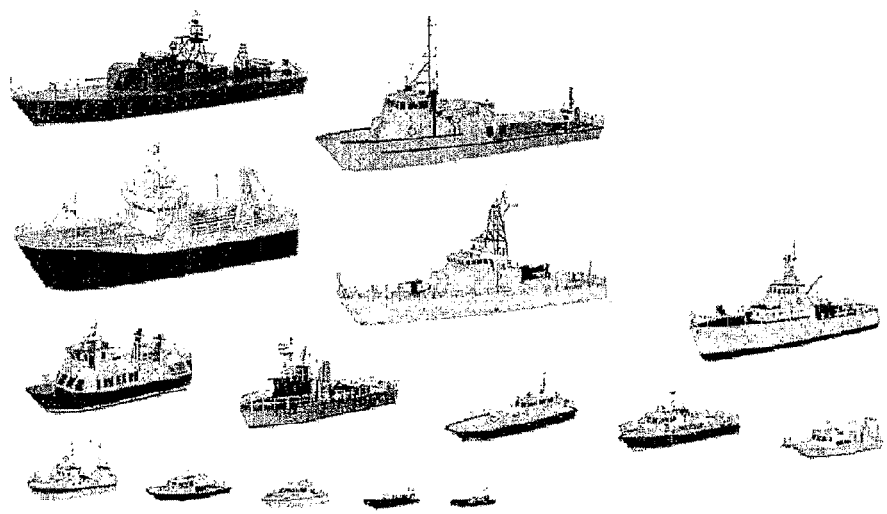
FIG. 4 shows examples of models that may be included in the model database.

FIG. 4 shows examples of model objects that may be included in the model database 31.

The method is suitable for a range of target sizes, from small to very large. The database should then include a large variety of possible objects. In the case that the method will be used for a new type of object, a type of object being e.g. boats, airplanes, ground vehicles, and it is preferable that the database is populated with a range of models of the new type.

Models are built from photographs or line drawings by using commercial software, like Rhinoceros [4].

Photos taken from different angles are required in order to produce true 3D models. Preferable orthogonal views (top-, side-, front-views). The building of models is a semi-manual process as each wire in the wire-frame model would have to be positioned manually. Non-orthogonal photos will require a more elaborate modelling process, and the models produced may be less accurate.

Figure 5:
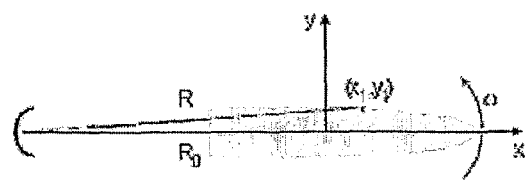
FIG. 5 is a basic ISAR system model, including coordinate system.

An object can be described in an object coordinate system ($x_m$, $y_m$, $z_m$) that is fixed in the centre of the object, as illustrated in FIG. 5. The $x_m$ axis points in the bow direction, ym, in the port direction, and zm upwards. The radar is elevated and points towards the ship with a depression angle a. There is an angle f between the xm axis and the radar ground range direction. The rotation of a model is done by a transformation onto range-Doppler image planes for the object.

The range-Doppler projection can be written $$\begin{bmatrix} r \\ f_d \end{bmatrix} \approx \begin{bmatrix} 1 & 0 & 0 \\ 0 & \dfrac{2\omega_z}{\lambda} & -\dfrac{2\omega_y}{\lambda} \end{bmatrix} \begin{bmatrix} x \\ y \\ z \end{bmatrix} \quad (1)$$

Where

?x, ?y and ?z are the arbitrary rotation of the object (decomposed around the x, y, and z-axis, respectively)

r is the target range (distance between radar and object)

fd is the Doppler frequency of the object.

The transformation between the object coordinate system and the x,y,z coordinate system is given by $$\begin{bmatrix} x \\ y \\ z \end{bmatrix} = \begin{bmatrix} \cos\alpha & 0 & -\sin\alpha \\ 0 & 1 & 0 \\ \sin\alpha & 0 & \cos\alpha \end{bmatrix} \begin{bmatrix} \cos\varphi & -\sin\varphi & 0 \\ \sin\varphi & \cos\varphi & 0 \\ 0 & 0 & 1 \end{bmatrix} \begin{bmatrix} x_m \\ y_m \\ z_m \end{bmatrix} \quad (2)$$

The transformation of all silhouettes is based on the above equations. Transformation is done by varying the depression angle, a, the angle between the xm axis and the radar ground range direction, f, and the object rotation, ?. More than 100 projections may be produced of each model in the training database.

The invention may be used for processing any ISAR image from sea, ground or flying radars. However, ISAR is best suited for observing objects with regular patterns of movement, such as boats or ships in heavy sea. Related techniques may be used for observing stationary objects or objects with linear movements, as long as the relative movement between sensor and object is sufficiently large to produce a clear image. This may make the described inventive method useful for identifying other vehicles, such as cars or planes, for finding buried mines, or for finding missing persons, such as persons buried in avalanches. The invention may in fact find applications in systems employing other sensors than radar. Thus, it may be useful in any system in which image forming sensors are providing clear images containing objects that is to be classified. An example of this is in airports where the passengers' luggage is scanned for security control. Presently, human operators are observing X-ray images of the luggage to recognize forbidden items. Such a procedure could be automated using the inventive classification method. Another possible application is in classification of objects in optical images in general, and in IR images in particular.

REFERENCES 1) http://en.wikipedia.org/wiki/Hough_transform, http://homepages.inf.ed.ac.uk/rbf/HIPR2/hough.htm 2) http://en.wikipedia.org/wiki/Method_of_least_squares 3) http://www.anc.ed.ac.uk/~amos/lfd/

4) http://www.rhino3d.com/

The invention claimed is:

1. A method of automatic classification of an observed object in Inverse Synthetic Aperture Radar (ISAR) image, comprising the steps of:
   extracting a silhouette of the observed object,
   extracting a length parameter for the silhouette of the observed object,
   retrieving, based on the extracted length, training silhouettes for model objects having a similar length corrected for range from a database with a range of training silhouettes representing model objects of different classes and with different orientation angles,
   comparing the silhouette of the observed object with said retrieved training silhouettes, and
   classifying the observed object as being of the model object class with highest correlation between the silhouettes of the observed and model objects.

2. The method of claim 1, where the observed object is present in a sequence of images, said method including classifying the observed object in several images in parallel.

3. The method of claim 1, wherein the silhouettes are formed by an edge detection method.

4. The method of claim 1, said method including the additional step of selecting objects to be classified by determining a set of features describing the orientation of the observed object and selecting only those observed objects that are oriented so as to clearly display the shape of the object.

5. The method of claim 4, wherein said set of features includes a ship's centreline, and determining the ship's centreline using a Hough transform.

6. The method of claim 4, wherein said set of features includes a ship's centreline, and determining the ship's centreline by fitting a straight line through the ship's hull using a least squares method.

7. The method of claim 4, wherein said set of features includes a ship's hull side, and finding said hull side by fitting a second degree curve to a side of the observed object using a least squares method.

8. The method of claim 1, wherein the classification step is performed by finding best match between observed object silhouette and training silhouette using a Nearest neighbour classifier.

9. The method of claim 1, wherein said image is an Inverse Synthetic Aperture Radar image.

10. The method of claim 9, wherein the training silhouettes are extracted from Inverse Synthetic Aperture Radar Images.

11. The method of claim 1, wherein the training silhouettes are obtained from 3D wire-frame models.

12. The method of claim 1, wherein said image is an X-ray image, an optical image or an Infra Red optical image.

13. The method of claim 1, in which a classification result is presented to an operator as an object ID; a code or a synthetic high definition optical image.

14. The method of claim 13, in which said classification result is presented together with information as to the importance of the object and/or a figure regarding the reliability of the classification result.

15. A system for automatic classification of an observed object in an Inverse Synthetic Aperture Radar (ISAR) image including a sensor supplying at least one image showing an observed object of interest, comprising:
   a pre-processing unit for extracting a silhouette of said observed object and extracting a length parameter for the silhouette of the observed object,
   a database with stored training silhouettes of classified model objects in several orientations, and a classification unit for selecting, based on the extracted length, a set of training silhouettes of model objects having similar length parameters corrected for range as in the observed object and retrieve said selected set from the database, said classification unit for comparing the silhouette of the observed object with said set of selected training silhouettes, and for classifying said observed object as being of the class corresponding to the training silhouettes which best matches the silhouette of the observed object.

16. The system of claim 15, where said sensor is an Inverse Synthetic Aperture Radar, or a X-ray sensor, or an optical sensor, or an Infra Red optical sensor.

17. The system of claim 15, where said sensor is a sea, ground or flying radar.

18. The system of claim 15, in which said preprocessing unit, database and classification unit are connected in a network.

* * * * *

UNITED STATES PATENT AND TRADEMARK OFFICE
CERTIFICATE OF CORRECTION

PATENT NO. : 8,063,815 B2  
APPLICATION NO. : 12/300972  
DATED : November 22, 2011  
INVENTOR(S) : Valø et al.

Page 1 of 1

It is certified that error appears in the above-identified patent and that said Letters Patent is hereby corrected as shown below:

On the Title Page, in Item (12), under "UNITED STATES PATENT", in Column 1, Line 1, delete "Valo" and insert -- Valø --, therefor.

On the Title Page, in Item (75), under "Inventors", in Column 1, Line 1, delete "Hilde Valo," and insert -- Valø, --, therefor.

In Column 2, Line 60, delete "database," and insert -- database, and --, therefor.

In Column 6, Line 24, in Claim 4, delete "said" and insert -- wherein said --, therefor.

Signed and Sealed this  
Fifteenth Day of May, 2012

David J. Kappos  
*Director of the United States Patent and Trademark Office*